R. E. LOCKE.
SEED CORN CASE.
APPLICATION FILED JAN. 7, 1913.

1,157,790.

Patented Oct. 26, 1915.
2 SHEETS—SHEET 1.

Witnesses.
H. P. Palmer
L. V. Daughty

Inventor:
R. E. Locke
H. Darde
Attorney.

R. E. LOCKE.
SEED CORN CASE.
APPLICATION FILED JAN. 7, 1913.

1,157,790.

Patented Oct. 26, 1915.
2 SHEETS—SHEET 2.

Witnesses:
H. J. Palmer
L. V. Daughtry

Inventor:
R. E. Locke
H. Sanders
by
Attorney.

UNITED STATES PATENT OFFICE.

ROBERT E. LOCKE, OF LONE ROCK, IOWA.

SEED-CORN CASE.

1,157,790.  Specification of Letters Patent.  Patented Oct. 26, 1915.

Application filed January 7, 1913. Serial No. 740,626.

*To all whom it may concern:*

Be it known that I, ROBERT E. LOCKE, a citizen of the United States, residing at Lone Rock, in the county of Kossuth and State of Iowa, have invented certain new and useful Improvements in Seed-Corn Cases, of which the following is a specification.

This invention relates to improvements in a seed corn case and its object is to produce a device of this class that is simple in construction and comprises a plurality of stalls the relative sizes of which may be varied at will.

With the foregoing and other objects in view the invention consists in the combination and arrangement of parts to be hereinafter fully described in the following specification, pointed out in the claim and illustrated in the accompanying drawings which form a part of the specification and in which—

Figure 1:
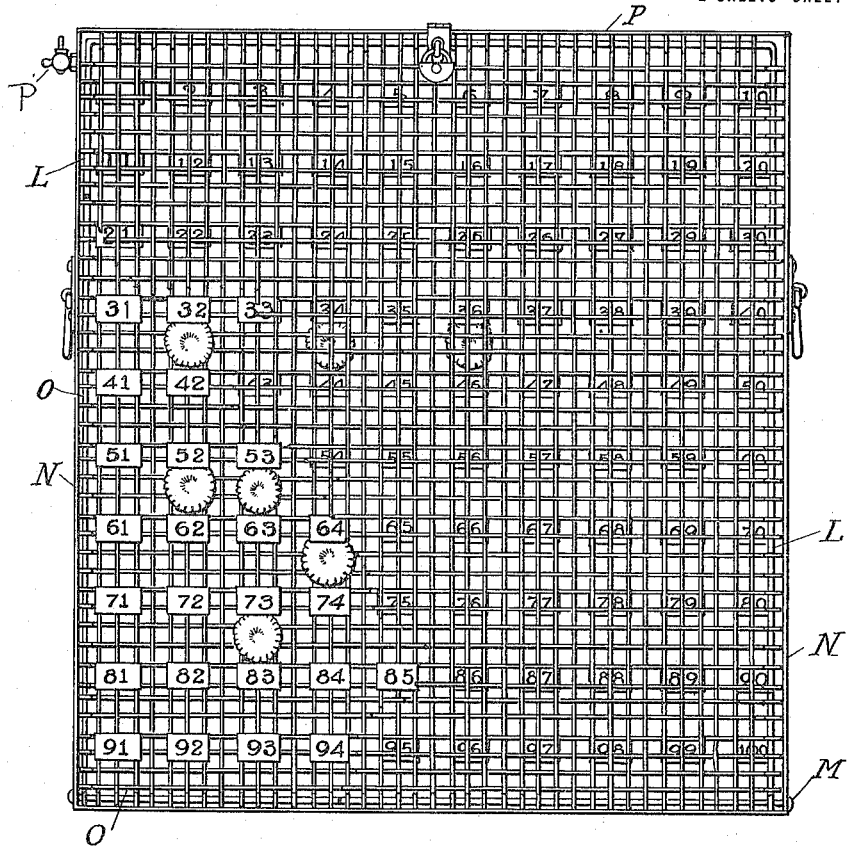
Figure 2:
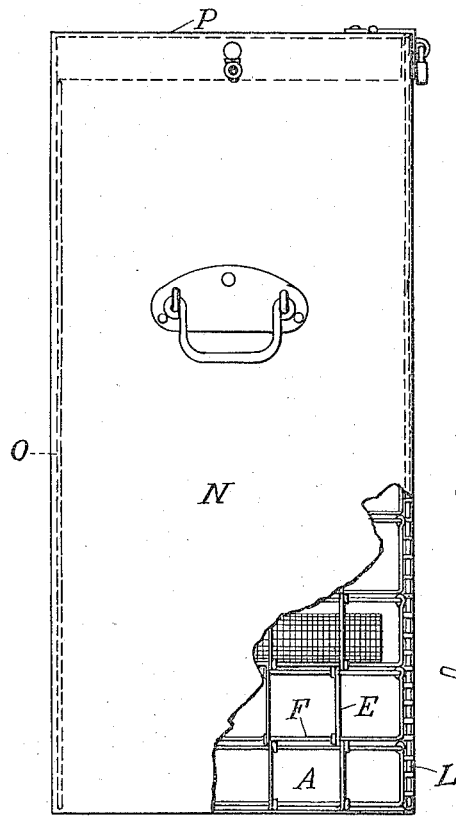
Figure 3:
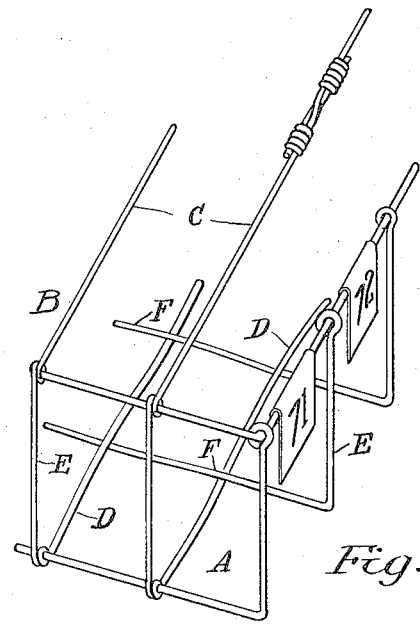
Figure 4:
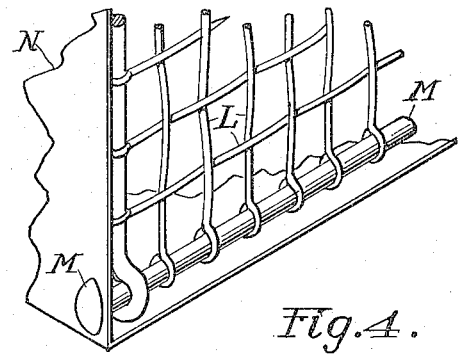

Figure 1 is a front elevation of my seed corn case with a portion of the screen door broken away. Fig. 2 is a side elevation with a portion of the metal covering broken away. Fig. 3 is an enlarged detail of one of the tiers that go to make up the corn case. Fig. 4 is an enlarged detail of the screen door hinge and its connection to the door and case.

Like reference characters indicate corresponding parts throughout the several views.

My corn case comprises a plurality of corn stalls B arranged in tiers A one above the other. The stalls are arranged consecutively from one end of the tier to the other. Each tier comprises a plurality of top wires C, bottom wires D and end wires E and the stalls in each tier are formed by movable transverse wires F. The several tiers are suitably secured together and to the case and the stalls in each tier may be consecutively numbered as illustrated in the drawings. The movability of the transverse wires F permits variation in the relative sizes of the stalls at will.

The front of my device is provided with a screen door L disposed upon a pivot M secured in the metallic sides N, N that cover the ends of the corn case while a screen back O admits air to the corn from the rear and a cover P is provided forming a housing for the device and to the last named member the door may be locked in any approved manner.

What is claimed is:—

A corn case comprising a housing having ventilating means, individually removable tiers arranged in said housing, each tier comprising top wires, bottom wires and end wires, and a plurality of transverse wires extending through each tier whereby the same is divided into a plurality of stalls, said cross wires being movable with relation to each other to vary the relative sizes of the said stalls when desired.

In testimony that I claim the foregoing as my own I have hereto affixed my signature in the presence of two subscribing witnesses.

ROBERT E. LOCKE.

Witnesses:
EDWARD C. BELL,
H. L. COTTON.

Copies of this patent may be obtained for five cents each, by addressing the "Commissioner of Patents, Washington, D. C."